(12) United States Patent  (10) Patent No.: US 7,570,882 B2
Gutierrez et al.  (45) Date of Patent: Aug. 4, 2009

(54) SHUTTER FOR MINIATURE CAMERA

(75) Inventors: Roman C. Gutierrez, Arcadia, CA (US); Robert J. Calvet, Pasadena, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 391 days.

(21) Appl. No.: 11/365,790

(22) Filed: Feb. 28, 2006

(65) Prior Publication Data

US 2007/0133976 A1 Jun. 14, 2007

Related U.S. Application Data

(63) Continuation-in-part of application No. 11/361,608, filed on Feb. 24, 2006.

(60) Provisional application No. 60/657,261, filed on Feb. 28, 2005.

(51) Int. Cl.
*G03B 7/00* (2006.01)

(52) U.S. Cl. .................. 396/220; 396/483; 396/484; 396/493

(58) Field of Classification Search ............. 396/248, 396/220, 262, 483, 484, 493, 495
See application file for complete search history.

(56) References Cited

U.S. PATENT DOCUMENTS

| 4,333,722 | A | * | 6/1982 | Lee ......................... 396/449 |
| 4,384,778 | A | * | 5/1983 | Lee et al. .................. 396/449 |
| 4,408,857 | A | * | 10/1983 | Frank ....................... 396/449 |
| 4,716,432 | A | | 12/1987 | Stephany |
| 6,033,131 | A | | 3/2000 | Ghosh |
| 6,205,267 | B1 | | 3/2001 | Aksyuk et al. |
| 6,535,311 | B1 | * | 3/2003 | Lindquist .................. 398/82 |
| 6,958,777 | B1 | | 10/2005 | Pine |
| 2003/0062422 | A1 | * | 4/2003 | Fateley et al. ............. 235/494 |
| 2005/0002086 | A1 | * | 1/2005 | Starkweather et al. ...... 359/291 |
| 2006/0033938 | A1 | * | 2/2006 | Kopf et al. ................ 358/1.7 |
| 2006/0209012 | A1 | * | 9/2006 | Hagood, IV ............... 345/109 |
| 2006/0250325 | A1 | * | 11/2006 | Hagood et al. ............. 345/55 |

* cited by examiner

*Primary Examiner*—W. B. Perkey
*Assistant Examiner*—Warren K Fenwick
(74) *Attorney, Agent, or Firm*—Haynes and Boone, LLP

(57) ABSTRACT

Systems and techniques for using one or more virtual pivots in a shutter system for a miniature camera. A virtual pivot system may comprise one or more flexures, so that a shutter apparatus may be rotated about a center of rotation without a physical rotation element at the center of rotation. The virtual pivot system may provide a number of benefits, including the reduction or elimination of stiction.

22 Claims, 4 Drawing Sheets

SHUTTER FOR MINIATURE CAMERA

CROSS-REFERENCE TO RELATED APPLICATIONS

This application claims the benefit of U.S. Provisional Patent Application No. 60/657,261 filed on Feb. 28, 2005 entitled "Autofocus Camera" which is incorporated herein by reference.

In addition, this application is a Continuation-In-Part application of U.S. patent application Ser. No. 11/361,608 filed on Feb. 24, 2006 entitled "Autofocus Camera", which is incorporated herein by reference.

BACKGROUND

1. Field of Invention

This invention generally relates to miniature cameras and, more particularly, to shutters for miniature cameras.

2. Related Art

Miniature cameras are currently available with many electronic devices, such as cellular telephones, laptop computers, personal digital assistants (PDAs), and the like. Miniature cameras are also available as stand-alone devices for applications such as security and surveillance.

The market for miniature cameras is rapidly expanding. For example, camera-equipped cell phones were unheard of just a few years ago; now, they are a significant portion of the cell phone market. However, available miniature cameras may not be optimal for some applications.

Camera shutters were developed to control the transmission of light through the camera's optical system to a film material. In a film (non-digital) camera, the shutter is positioned in front of the camera optics prior to film exposure. To begin the picture taking process, the user presses a button. In response, the shutter moves to a position that allows light to reach the camera optics, and film exposure begins. After the desired exposure time has elapsed, the shutter moves back to the initial position in front of the camera optics. Film advance mechanisms move the exposed film away from the exposure position, while un-exposed film is moved to the exposure position to be exposed at a later time.

Unlike film cameras, digital cameras need not include a mechanical shutter. Instead, shuttering may be performed electronically. However, some digital camera systems use a mechanical shutter in addition to electronic shuttering. FIG. 1 shows an example of a mechanical shutter system 100, according to the prior art.

Shutter system 100 includes a mechanical shutter 130 with a pivot pin 135 and an actuator 140. System 100 is included as part of a digital camera 110, which has a light aperture 120 configured to receive light to be processed to generate image information for an exposure. Note that the term "exposure" in the context of digital photography refers to the time during which light is received for a particular digital image, rather than a time during which film is exposed.

Digital camera 110 includes a controller (not shown) and a digital imaging system (not shown), such as a CMOS (complementary metal-oxide semiconductor) system or a CCD (charge coupled device) imaging system. Received light corresponding to a matrix of image pixels is processed to generate a digital image.

In contrast to the film camera described above, shutter 130 may initially be positioned away from aperture 120. The user may push a button 125 to begin the exposure. In response, the controller may zero the pixels of the digital imaging system to begin digital image data acquisition. At the end of the exposure time, shutter 130 may be moved in front of aperture 120 to indicate the end of the image. In order to move shutter 130, a force may be applied using actuator 140 to rotate shutter 130 about the pivot point created by pivot pin 135. After a short time, the force may be removed, so that shutter 130 moves back to its initial position away from aperture 120.

SUMMARY

Systems and techniques provided herein may allow for improved shuttering in miniature cameras by incorporating virtual pivot systems. The virtual pivot systems may incorporate one or more flexures, and may transmit a force from an actuator to a shutter apparatus. As a result, the shutter system need not incorporate a physical rotation element at the center of rotation. Stiction and wear of associated camera parts may thus be reduced or eliminated.

In general, in one aspect, a MEMS shutter system for a camera may comprise a shutter and a virtual pivot system in communication with the shutter. The virtual pivot system may comprise one or more flexures configured to position the shutter.

The shutter system may comprise a first portion configured to cover a light-receiving aperture of the camera and a second portion configured to move the shutter element in response to an applied force, wherein the second portion does not rotate about a pivot mechanism separate from the shutter.

The virtual pivot system may be in mechanical communication with the second portion of the shutter, and the virtual pivot system may be configured to alternately position the first portion to cover the light-receiving aperture of the camera and to position the first portion away from the light-receiving aperture of the camera.

The virtual pivot system may comprise a first flexure attached to the shutter at a first location, wherein the virtual pivot system is configured to rotate the shutter about a center of rotation, and wherein the first location is different than the center of rotation of the shutter. The virtual pivot system may further comprise a second flexure attached to the shutter at a second location different than the first location, and wherein the second location is different than the center of rotation of the shutter. The shutter, the first flexure, and the second flexure may be fabricated from a single piece of material. The shutter and at least a part of the virtual pivot system may be fabricated from a single piece of material. The material may include silicon.

The system may include the camera, and the shutter may be positioned to alternately block light through a light-receiving aperture of the camera and to allow light into the light-receiving aperture of the camera. The virtual pivot system may be configured to rotate the shutter about a center of rotation, and the virtual pivot system may comprise a first flexure attached to the shutter at a first location, wherein the first location is located at a center of rotation of the shutter element.

The shutter may comprise a first shutter element and a second shutter element, and the virtual pivot system may comprise a first portion configured to transmit force to the first shutter element and a second portion configured to transmit force to the second shutter element. The shutter may include one or more openings configured to reduce the moment of inertia of the shutter in operation. The virtual pivot system may include a snubber.

In general, in another aspect, a miniature camera may comprise an optical detection system configured to receive light through an aperture and a MEMS shutter system. The shutter system may comprise a shutter element including an aperture-blocking portion and a force-receiving portion, the shutter element configured to rotate about a center of rotation, the shutter element not including a pivot mechanism separate from the shutter element at the center of rotation. The camera may further include a controller configured to control the shutter element and the optical detection system. The optical detection system may comprise at least one of a charge coupled device optical detection system and a complementary metal oxide semiconductor optical detection system.

In general, in another aspect, a MEMS shutter system for a camera may comprise means for alternately blocking and unblocking a light-receiving means of the camera, and virtual pivoting means for pivoting the shutter in communication with the means for alternately blocking and unblocking the light-receiving means.

These and other features and advantages of the present invention will be more readily apparent from the detailed description of the exemplary implementations set forth below. taken in conjunction with the accompanying drawings.

BRIEF DESCRIPTION OF THE DRAWINGS

Like reference symbols in the various drawings indicate like elements.

DETAILED DESCRIPTION

Systems and techniques described herein incorporate one or more virtual pivots, for fast and reliable mechanical shuttering for miniature camera systems.

As noted above, mechanical shutters incorporating a pivot pin are used in some available digital camera systems, including miniature camera systems. However, existing configurations may not be optimal for some uses.

Figure 1:
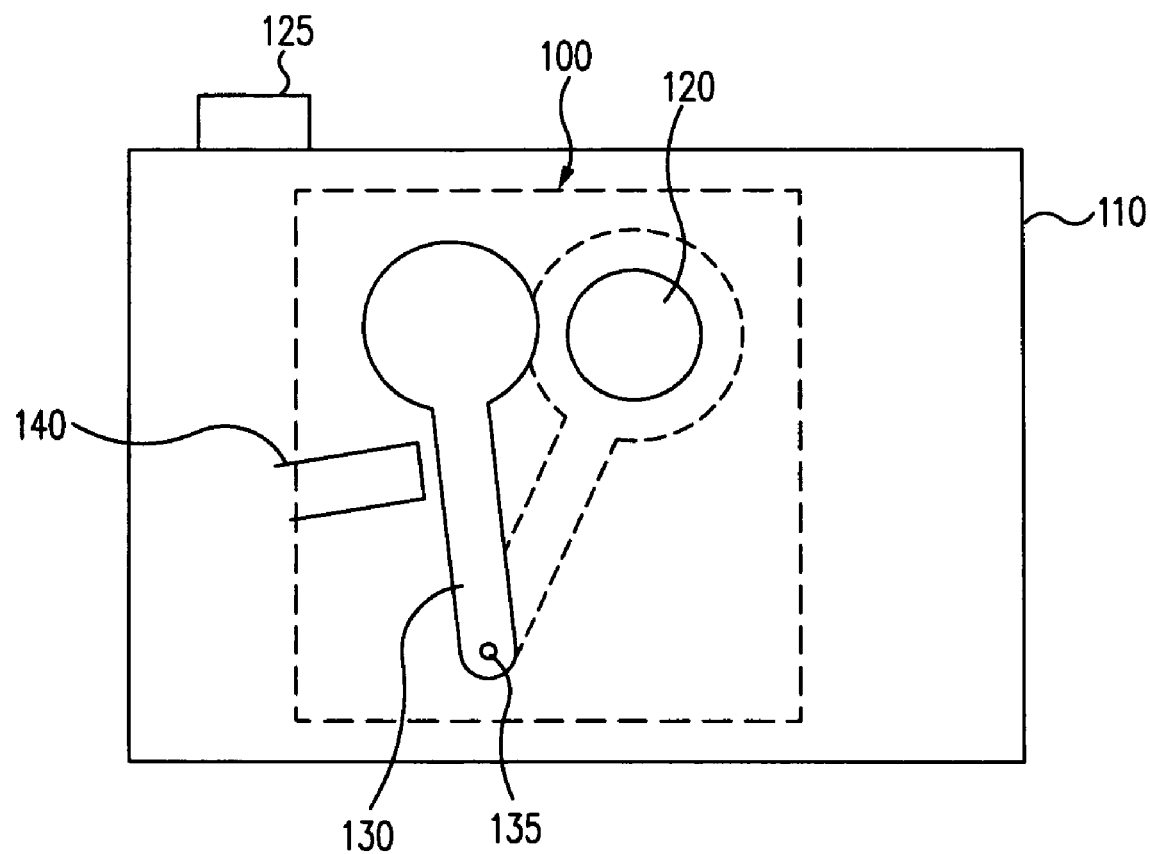
FIG. 1 is a schematic diagram of a shutter system according to the prior art.

For example, a pivot system such as that shown in FIG. 1 and described above may not provide rapid and reliable shutter movement for some miniature camera applications. In order to initiate movement of shutter 130, actuator 140 must provide a force great enough to overcome the static friction (stiction) at the interface of the surface of pivot pin 135 with shutter 130. In order to move shutter 130 quickly, a large initial force may be used. However, after shutter 130 begins to move, the large force may cause shutter 130 to overshoot its desired position in front of aperture 120.

Alternately, the force may be increased slowly until shutter 130 begins to move, then decreased so that the movement of shutter 130 is more controlled. However, this may slow the shuttering process significantly. Additionally, in existing systems, there may be an unknown lag between the time at which the shutter is commanded to move and the time at which it actually moves. Contacting surfaces also wear, and can jam.

Figure 2:
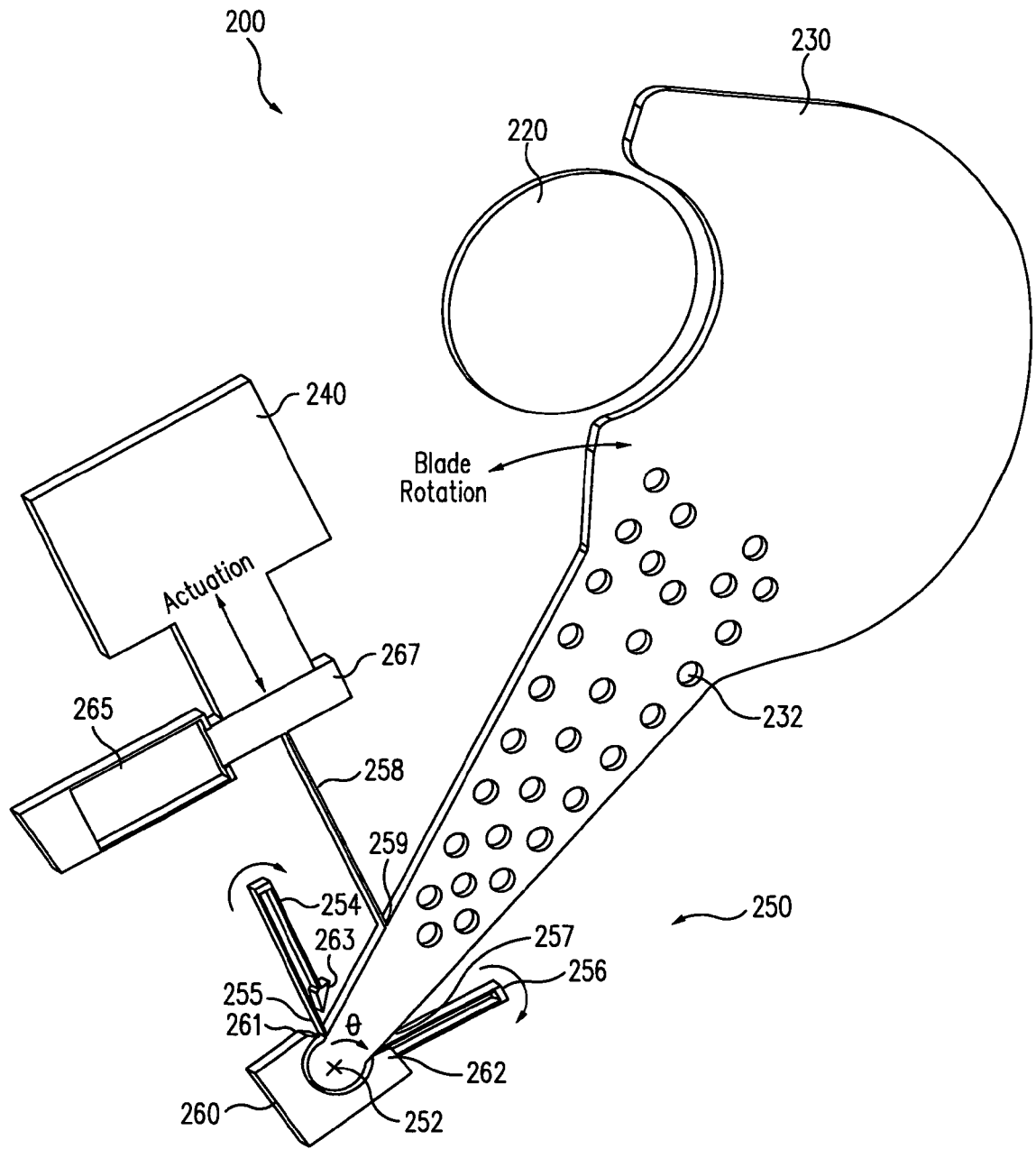
FIG. 2 is a front view of a shutter system, according to some embodiments.

FIG. 2 shows an embodiment of a shutter system 200 incorporating a virtual pivot, for more fast and reliable mechanical shuttering. By using a virtual pivot rather than a physical pivot pin located at the center of rotation, stiction effects may be avoided. Shutter system 200 may be incorporated into a miniature digital camera (not shown) that obtains image data and generates images as described above.

System 200 includes a shutter 230. Prior to an exposure, shutter 230 is positioned away from an aperture 220. When a user initiates an exposure, the camera initializes the image pixels to zero and begins to acquire image data for the picture. At the end of the exposure time, shutter 230 may be moved into a position blocking light from aperture 220 using a virtual pivot system 250 configured to pivot shutter 230 about a center of rotation 252 without the use of a physical pivot mechanism at center of rotation 252.

In FIG. 2, virtual pivot system 250 comprises a first flexure 254 attached to shutter 230 at a first position 255, and a second flexure 256 attached to shutter 230 at a second position 257. System 200 further includes a flexure 258 attached to shutter 230 at a third position 259, which is used for actuation of virtual pivot system 250. Second flexure 254 may also be attached to a snubber 260 or other structural element. Virtual pivot system 250 further comprises an assembly to transmit force from an actuator 240 to be transmitted using a flexure 258, where the assembly includes a portion 265 that is attached at one end to a structural element of the camera, includes flexing elements as well. A second portion 267 is in mechanical communication with actuator 240, and transmits force via flexure 258. Note that although FIG. 2 shows force transmitted to the shutter using a flexure 258, other apparatus may be used. For example, beams, arms, or other elements may be used to transmit force from an actuator to the shutter.

Actuation can be implemented using a number of different actuation types. For example, electromagnetic actuators such as voice coil actuators may be used. Other actuator types that may be used include electrostatic, piezoelectric, thermal, memory alloy, or other actuators.

Flexures such as first flexure 254 and second flexure 256 allow movement in particular directions but substantially prevent movement in others. In response to an applied force at third position 259, first flexure 254 and second flexure 256 apply forces in different directions to shutter 230, causing it to rotate about center of rotation 252. As a result, shutter 230 is moved to or from its position in front of aperture 220. First flexure 254 and second flexure 256 are at an angle θ with respect to one another. In FIG. 2, θ is equal to about ninety degrees, for optimal efficiency. However, other angles may be used.

Virtual pivot system 250 may also include one or more features to limit the rotation of shutter 230. For example, rotation of shutter 230 as it moves into position in front of aperture 220 may be limited by a first feature 261 of snubber 260 and an end feature 263 of first flexure 254. Rotation of shutter 230 may be limited by second feature 262 of snubber 260 as it moves away from aperture 220.

System 200 may provide a number of advantages not found in available mechanical shutter systems. First, since there is no pivot pin at center of rotation 252, the resulting stiction problems are not encountered. Instead, shutter 230 may be quickly and accurately positioned with respect to aperture 220. Second, snubber 260 and features 261, 262, and 263 may cushion the elements of system 200 from shock.

FIG. 2 also illustrates an embodiment in which the moment of inertia of shutter 230 about center of rotation 252 is reduced by fabricating shutter 230 with one or more openings in the portion of shutter 230 not used to block light from aperture 220. By reducing the moment of inertia, shutter 230 may be moved more quickly into and out of position in front of aperture 220.

Further, in some embodiments, some elements may be fabricated as a single piece. For example, at least shutter 230, snubber 260, first flexure 254, and second flexure 256 may be fabricated as a single piece of material such as silicon. As a result, manufacturing variations of the shutter elements may be reduced, and camera assembly may be simplified. Fabricating at least some parts of system 200 as a single unit may also enable the design of even smaller miniature cameras. For example, in some embodiments, the shutter may be about 4 mm to about 12 mm long, and may cover an aperture of about 1 mm to about 3 mm.

Figure 3:
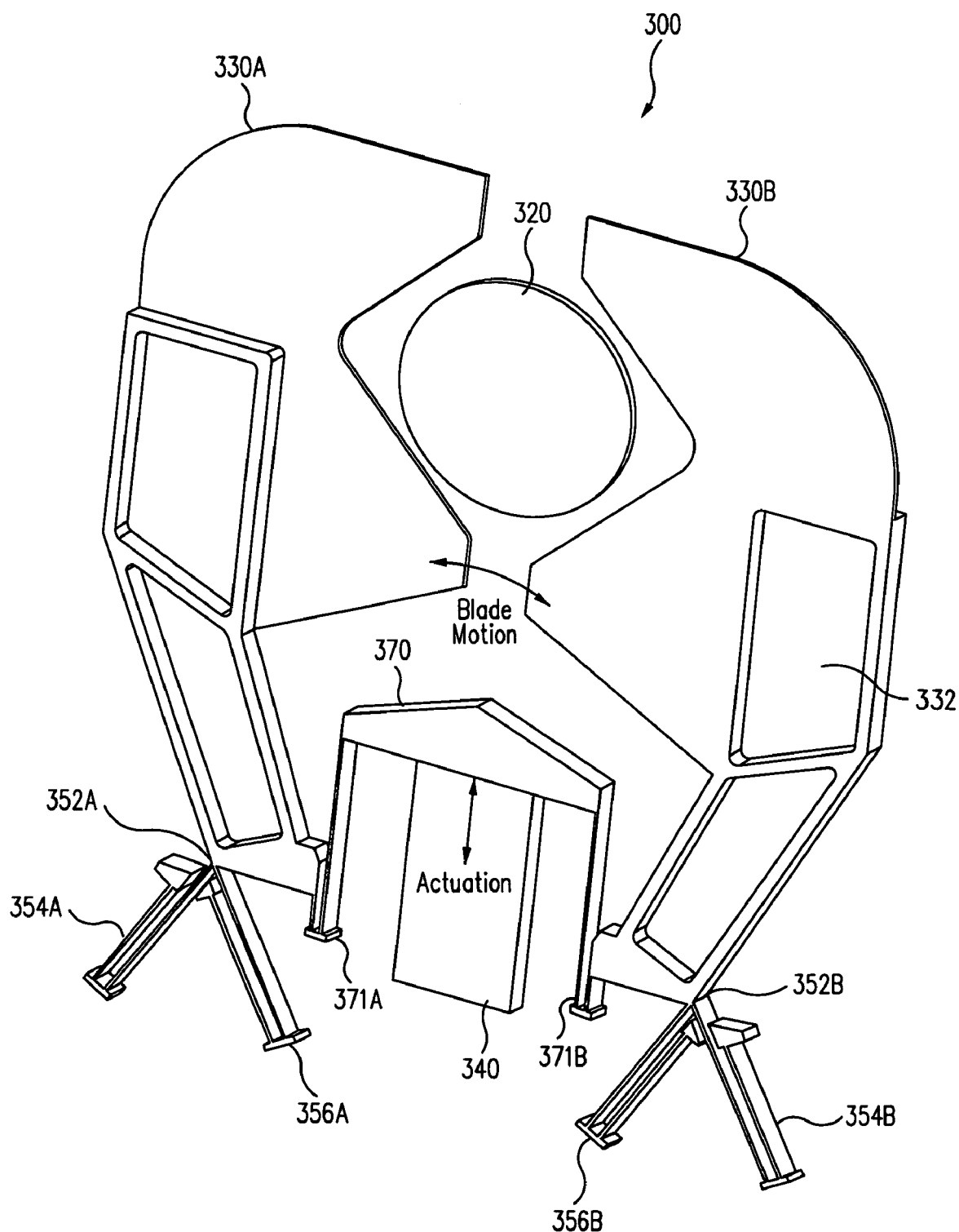
FIG. 3 is a front view of a different shutter system, according to some embodiments.

FIG. 2 illustrates an embodiment in which shutter 230 is a single unit. However, in some embodiments multiple units may be used. FIG. 3 illustrates a shutter system 300 including a first shutter unit 330A and a second shutter unit 330B.

In order to move first shutter unit 330A and second shutter unit 330B into or away from its position in front of aperture 320, an actuator 340 transmits a force to a force transmission member 370. In response, flexures 371A and 371B transmit force to first and second shutter units 330A and 330B, respectively. First shutter unit 330A rotates about center of rotation 352A in response to forces exerted by a first flexure 354A and a second flexure 356A. Similarly, second shutter unit 330B rotates about center of rotation 352B in response to forces exerted by a first flexure 354B and a second flexure 356B. Although not shown in FIG. 3, first flexures 354A and 354B are fixed to a structural member of the camera (e.g., the package) to enable movement of first and second shutter units 330A and 330B. In FIG. 3, the contact areas are labeled "pivots" and may be made as large and in any shape needed.

In the embodiment illustrated in FIG. 3, the centers of rotation 352A and 352B are located where the associated first and second flexures are attached to first and second shutter units 330A and 330B. As with the embodiment illustrated in FIG. 2, no stiction is associated with the rotation at centers of rotation 352A and 352B, since a physical pivot pin (and the associated frictional force at the interface between the pin surface and shutter hole surface) is not used.

As with the embodiment of FIG. 2, at least some of system 300 may be fabricated as a single piece (e.g., as a single piece of silicon). For example, first and second shutter elements 330A and 330B, force transmission member 370, and flexures 371A, 371B, 354A, 354B, 356A, and 356B may be fabricated from a single piece.

Figure 4:
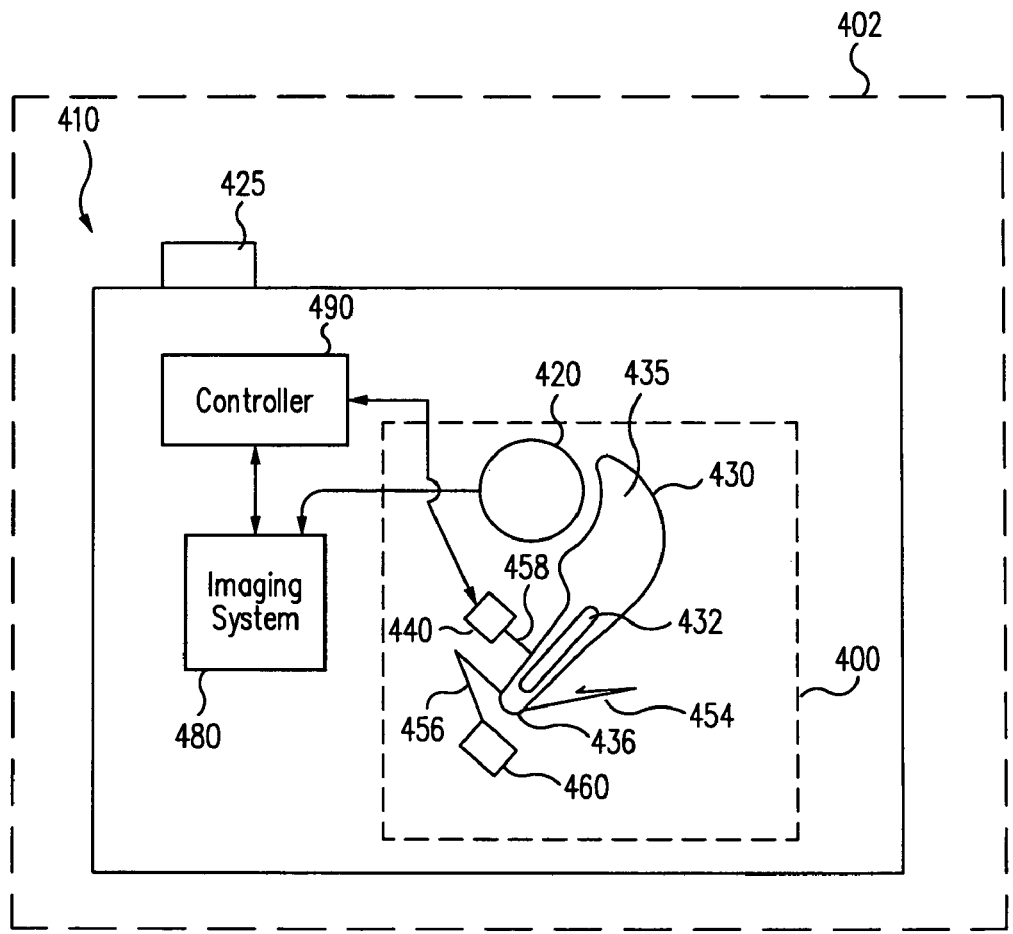
FIG. 4 is a schematic diagram of a miniature camera incorporating a shutter system such as the shutter systems shown in FIGS. 3 and 4.

As noted above, shutter systems such as those shown in FIGS. 2 and 3 and described above may be particularly beneficial for miniature cameras. FIG. 4 shows a miniature camera 410 that may incorporate a shutter system 400 such as system 200 of FIG. 2 or system 300 of FIG. 3. As noted above, miniature camera 410 may be a stand-alone device, or may be included in another device 402 (such as a cellular telephone, PDA, laptop computer, or other device).

Miniature camera 410 includes a light-receiving aperture 420 configured to receive light for a desired image. A shutter element 430 includes a first portion 435 configured to cover the light-receiving aperture 420 and a second portion 436 configured to move shutter element 430 in response to an applied force. Rather than rotating around a pivot mechanism (such as a pivot pin) separate from shutter element 430 (thereby generating frictional forces), second portion 436 rotates in response to forces applied via a virtual pivot system. In system 400, the virtual pivot system includes a first flexure 454, and a second flexure 456. The virtual pivot system may also include a snubber or other structural element 460, a force transmission arm 458, and an actuator 440.

Miniature camera 410 further includes a controller 490 and a digital imaging system 480, such as a CMOS (complementary metal-oxide semiconductor) system or a CCD (charge coupled device) imaging system. Received light corresponding to a matrix of image pixels is processed to generate a digital image.

In some embodiments, shutter element 430 may initially be positioned away from aperture 420. The user may push a button 425 of the camera 410 or other device 402 to begin the exposure. In response, controller 490 may zero the pixels of digital imaging system 480 to begin digital image data acquisition. At the end of the exposure time, shutter element 430 may be moved in front of aperture 420 to indicate the end of the image. In order to move shutter 430, a force may be applied using actuator 440 to rotate shutter 430 about its center of rotation.

Figure 5:
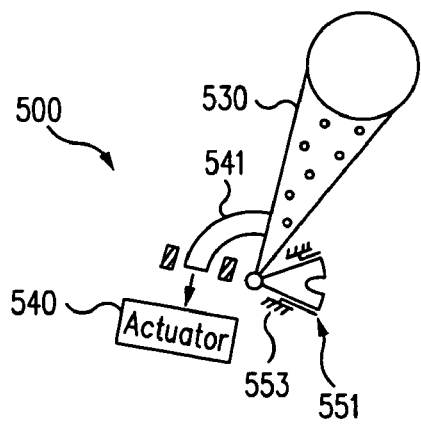
FIG. 5 is a front view of a shutter system, according to another embodiment.

FIG. 5 shows another embodiment of a shutter system 500 that may be used. A shutter 530 may move in response to a force applied by an actuator 540 using a force transmitter 541 (which may be a single unit, or may comprise more than one components). A rotational flexure system 551 includes one or more flexures, and applies a force to cause shutter 530 to rotate. Rotational flexure system 551 may be attached to one or more structural portions of a camera; for example, at a contact portion 553. Multiple contact portions may be used (as shown in FIG. 5), and may be shaped and sized to provide desired results.

Shutter systems such as those described herein may be fabricated using MEMS technology. For example, the structures may first be patterned on a substrate using photolithography, and then the substrate etched according to the pattern. Deep reactive ion etching (DRIE) may be used to etch the structures on the substrate. Other methods that may be used include laser cutting, water cutting, or other system with sufficient precision. In some embodiments, an enhanced etch system such as that described in co-pending U.S. patent application Ser. No. 11/365,047, entitled ENHANCED ETCH SYSTEMS, filed on Feb. 28, 2006, the disclosure of which is incorporated by reference in its entirety.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art.

For example, although the virtual pivot system (which performs the function of pivoting the shutter without a pivot mechanism separate from the shutter at the center of rotation) is described as being implemented using flexures, other elements may be used to transmit force to move a shutter toward and/or away from an aperture of a camera. For example, the shutter may be pivoted using other structural elements known in the art for applying force mechanically, other structural elements known in the art for applying force electromagnetically, or other structural elements known in the art for applying force to pivot the shutter.

Additionally, although cameras may incorporate an aperture to perform the function of receiving light, other structures are possible. For example, structures such as fiberoptics, light guides, or other structures known in the art may be used. Although one-and two-element shutters are shown, other structures may be used to alternately block light and transmit light to the camera. For example, more shutter elements may be used, or other structures known in the art.

Additionally, although one or more shutter elements may be positioned away from an aperture at the beginning of the exposure and moved into position in front of the aperture at the end of the exposure, other methods may be used. For example, the shutter element may initially be positioned in front of the aperture, and moved away for the exposure.

Also, only those claims which use the word "means" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. A MEMS shutter system for a camera, comprising:
    a shutter;
    a virtual pivot system coupled to the shutter, the virtual pivot system comprising one or more flexures configured to position the shutter; and,
    a snubber arranged to mechanically limit the maximum angular displacement of the shutter in at least one of two opposite pivot directions.

2. The shutter system of claim 1, wherein the shutter comprises a first portion configured to cover a light-receiving aperture of the camera and a second portion configured to move the shutter element in response to an applied force, wherein the second portion does not rotate about a pivot mechanism separate from the shutter.

3. The shutter system of claim 2, wherein the virtual pivot system is in mechanical communication with the second portion of the shutter, and wherein the virtual pivot system is configured to alternately position the first portion to cover the light-receiving aperture of the camera and to position the first portion away from the light-receiving aperture of the camera.

4. The shutter system of claim 1, wherein the virtual pivot system comprises a first flexure attached to the shutter at a first location, wherein the virtual pivot system is configured to rotate the shutter about a center of rotation, and wherein the first location is different than the center of rotation of the shutter.

5. The shutter system of claim 4, wherein the virtual pivot system further comprises a second flexure attached to the shutter at a second location different than the first location and wherein the second location is different than the center of rotation of the shutter.

6. The shutter system of claim 5, wherein the shutter, the first flexure, and the second flexure are fabricated from a single piece of material.

7. The shutter system of claim 1, wherein the shutter and at least a part of the virtual pivot system are fabricated from a single piece of material.

8. The shutter system of claim 7, wherein the material comprises silicon.

9. The shutter system of claim 1, further comprising the camera, and wherein the shutter is positioned to alternately block light through a light-receiving aperture of the camera and to allow light into the light-receiving aperture of the camera.

10. The shutter system of claim 1, wherein the virtual pivot system is configured to rotate the shutter about a center of rotation, and wherein the virtual pivot system comprises a first flexure attached to the shutter at a first location, wherein the first location is located at a center of rotation of the shutter element.

11. The shutter system of claim 1, wherein the shutter comprises a first shutter element and a second shutter element, and wherein the virtual pivot system comprises a first portion configured to transmit force to the first shutter element and a second portion configured to transmit force to the second shutter element.

12. The shutter system of claim 1, wherein the shutter includes one or more openings configured to reduce the moment of inertia of the shutter in operation.

13. A miniature camera, comprising:
    an optical detection system configured to receive light through an aperture; and,
    a MIEMS shutter system comprising:
        a shutter element including an aperture-blocking portion and a force-receiving portion, the shutter element configured to rotate about a center of rotation, the shutter element not including a pivot mechanism separate from the shutter element at the center of rotation;
        a snubber arranged to mechanically limit the maximum angular displacement of the aperture-blocking portion of the shutter element in at least one of two opposite pivot directions; and,
        a controller, the controller configured to control the shutter element and the optical detection system.

14. The camera of claim 13, wherein the optical detection system comprises at least one of a charge coupled device optical detection system and a complementary metal oxide semiconductor optical detection system.

15. The camera of claim 13, wherein the shutter element is configured to rotate about the center of rotation in response to a force transmitted from an actuator to the shutter element 16. The camera of claim 15, wherein the shutter element is configured to rotate about the center of rotation in response to a force transmitted by a first flexure attached to the force-receiving portion at a first location, and further configured to rotate about the center of rotation in response to a force transmitted by a second flexure attached to the force-receiving portion at a second location.

17. The camera of claim 16, wherein the first flexure extends substantially in a first direction and the second flexure extends substantially in a second direction, and wherein the first direction is about perpendicular to the second direction.

18. The camera of claim 16, wherein the shutter element is further configured to rotate about the center of rotation in response to a force transmitted by a force transmission member in mechanical communication with an actuator.

19. The camera of claim 18, wherein the force transmission member is attached to the force-receiving portion at a third location different than the first location and the second location.

20. The camera of claim 16, wherein the shutter element, the first flexure, and the second flexure are fabricated from a single piece of material.

21. The camera of claim 20, wherein the miniature camera is included in at least one of a cellular telephone, a computer, and a personal data assistant.

22. The camera of claim 18, wherein the force transmission member comprises a flexure.

* * * * *

UNITED STATES PATENT AND TRADEMARK OFFICE
CERTIFICATE OF CORRECTION

PATENT NO. : 7,570,882 B2  Page 1 of 1
APPLICATION NO. : 11/365790
DATED : August 4, 2009
INVENTOR(S) : Roman C. Gutierrez et al.

It is certified that error appears in the above-identified patent and that said Letters Patent is hereby corrected as shown below:

On title page please correct item number (73).

It should read:

Assignee: SIIMPEL CORPORATION
          Arcadia, California 91006

Instead of:
Assignee: Samsung Electronics co., Ltd.
          Gyeonggi-do (KR)

Signed and Sealed this

Eighteenth Day of May, 2010

David J. Kappos
*Director of the United States Patent and Trademark Office*